United States Patent
LoPiccolo et al.

(10) Patent No.: US 10,152,033 B2
(45) Date of Patent: *Dec. 11, 2018

(54) PROPORTIONAL INTEGRAL DERIVATIVE CONTROL INCORPORATING MULTIPLE ACTUATORS

(71) Applicant: Varian Semiconductor Equipment Associates, Inc., Gloucester, MA (US)

(72) Inventors: Jack J. LoPiccolo, Gloucester, MA (US); Robert J. Mitchell, Winchester, MA (US)

(73) Assignee: VARIAN SEMICONDUCTOR EQUIPMENT ASSOCIATES, INC., Gloucester, MA (US)

( * ) Notice: Subject to any disclaimer, the term of this patent is extended or adjusted under 35 U.S.C. 154(b) by 299 days.

This patent is subject to a terminal disclaimer.

(21) Appl. No.: 15/061,318

(22) Filed: Mar. 4, 2016

(65) Prior Publication Data
US 2017/0220007 A1    Aug. 3, 2017

Related U.S. Application Data

(63) Continuation-in-part of application No. 15/012,284, filed on Feb. 1, 2016, now Pat. No. 9,891,599.

(51) Int. Cl.
*B25J 9/16* (2006.01)
*G05B 11/42* (2006.01)

(52) U.S. Cl.
CPC .......... *G05B 11/42* (2013.01); *B25J 9/163* (2013.01); *Y10S 901/09* (2013.01)

(58) Field of Classification Search
CPC .......... G05B 11/42; G05B 2219/41387; B25J 9/1633
See application file for complete search history.

(56) References Cited

U.S. PATENT DOCUMENTS 3,840,128 A * 10/1974 Swoboda, Jr. .......... B25J 9/045
182/2.11
4,557,191 A * 12/1985 Speicher .................... B25J 9/04
101/35

(Continued)

FOREIGN PATENT DOCUMENTS

JP          2007326499 A     12/2007

OTHER PUBLICATIONS

International Search Report and Written Opinion dated Apr. 20, 2017 for PCT Patent Application No. PCT/US2017/012435 filed Jan. 6, 2017.

*Primary Examiner* — Timothy R Waggoner

(57) ABSTRACT

Embodiments of the disclosure provide proportional integral derivative control (PID) using multiple actuators. In one embodiment, a process includes providing a PID controller in communication with a primary actuator and a secondary actuator, the primary actuator and the secondary actuator coupled to a handler. The process further includes receiving position feedback and a specified trajectory for the handler, and generating a dynamic feedforward force command and a position correction command for the handler based on the position feedback and the specified trajectory. The process further includes providing, from the PID controller, the dynamic feedforward force command to the secondary actuator and the position correction command to the primary actuator.

20 Claims, 4 Drawing Sheets

(56) References Cited

U.S. PATENT DOCUMENTS

| | | | |
|---|---|---|---|
| 4,688,983 A * | 8/1987 | Lindbom | B25J 9/046 |
| | | | 414/735 |
| 4,925,312 A | 5/1990 | Onaga et al. | |
| 7,193,493 B2 | 3/2007 | Asano et al. | |
| 7,741,802 B2 | 6/2010 | Prisco et al. | |
| 8,301,275 B2 | 10/2012 | Tondolo et al. | |
| 8,427,093 B2 | 4/2013 | Park | |
| 8,942,846 B2 | 1/2015 | Jacobsen et al. | |
| 8,958,914 B2 | 2/2015 | Inazumi | |
| 8,958,915 B2 | 2/2015 | Takagi | |
| 9,050,724 B2 | 6/2015 | Takagi | |
| 9,604,359 B1 | 3/2017 | Grotmol et al. | |
| 2004/0112164 A1 | 6/2004 | Asano et al. | |
| 2007/0151389 A1 | 7/2007 | Prisco et al. | |
| 2013/0158712 A1 | 6/2013 | Lee et al. | |
| 2013/0211595 A1 | 8/2013 | Takagi | |
| 2013/0211596 A1 | 8/2013 | Takagi | |

\* cited by examiner

PROPORTIONAL INTEGRAL DERIVATIVE CONTROL INCORPORATING MULTIPLE ACTUATORS

CROSS-REFERENCE TO RELATED APPLICATION

This application is a Continuation-in-Part application of pending U.S. patent application Ser. No. 15/012,284, filed Feb. 1, 2016, the entirety of which application is incorporated by reference.

FIELD OF THE DISCLOSURE

Embodiments of the disclosure provided herein generally relate to a system for controlling multiple motors used as a driving source of a machine such as a robot, machine tool, or industrial machine.

BACKGROUND OF THE DISCLOSURE

A proportional-integral-derivative (PID) controller is a control loop feedback device commonly used in industrial control systems. A PID controller periodically calculates an error value as the difference between a measured process variable and an intended setpoint. The PID controller attempts to minimize the error over time by adjustment of a control variable, such as the position of a robotic arm supporting a payload.

While PID controllers are applicable to many control problems, PID controllers often perform poorly because PID control is inherently a feedback system using constant parameters, yet with no direct knowledge of the process. Thus overall performance is reactive and a compromise. In one example, when used alone, PID controllers may give poor performance when the PID loop gains are to be reduced so the control system does not overshoot, oscillate, or hunt near the control setpoint value.

Feedforward control is one technique used to improve the shortcomings of conventional (feedback) PID controllers, as feed-forward control incorporates knowledge regarding the system. The PID controller communicates with one actuator responsible for error correction and dynamic torque (feed forward) control. In this configuration, the dynamic (feed forward) torque can be orders of magnitude larger than the torque necessary for corrections on position error. Therefore, a same actuator tasked with providing error correction and dynamic torque control is generally larger, creating space and packaging issues. Furthermore, these actuators need to be replaced or serviced more often, and are not as easily monitored for identification of wear.

SUMMARY OF THE DISCLOSURE

In view of the foregoing, embodiments herein provide proportional integral derivative control (PID) using multiple actuators. Unlike conventional feed forward applications having one motor controlling feedback and feedforward modes, embodiments herein employ a secondary motor dedicated to feed forward (open loop) control. The primary motor may then be used in feedback mode for smaller corrections on the error.

In one embodiment, a process includes providing a PID controller in communication with a primary actuator and a secondary actuator, the primary actuator and the secondary actuator coupled to a handler. The process further includes receiving position feedback and a specified trajectory for the handler, and generating a dynamic feedforward force command and a position correction command for the handler based on the position feedback and the specified trajectory. The process further includes providing, from the PID controller, the dynamic feedforward force command to the secondary actuator and the position correction command to the primary actuator.

In another embodiment a system includes a robotic arm coupled to a primary actuator and a secondary actuator, a first control loop including the primary actuator in communication with a proportional integral derivative (PID) controller, wherein the first control loop communicates, from the PID controller, a position correction command to the primary actuator based on position feedback from the robotic arm. The system further includes a second control loop including the secondary actuator in communication with the PID controller, wherein the second control loop communicates a dynamic feedforward force command to the secondary actuator based on the position feedback and a specified trajectory of the robotic arm.

In yet another embodiment, a computer system for providing proportional integral derivative (PID) control using multiple actuators includes a memory medium comprising program instructions, and a PID controller. The PID controller, when executing the program instructions, causes the computer system to receive position feedback and a specified trajectory for a robotic arm, and generate a dynamic feedforward force command and a position correction command for the robotic arm based on the position feedback and the specified trajectory. The PID further causes the system to provide, from the PID controller, the dynamic feedforward force command to a secondary actuator coupled to the robotic arm, and provide, from the PID controller, the position correction command to a primary actuator coupled to the robotic arm.

The drawings are not necessarily to scale. The drawings are merely representations, not intended to portray specific parameters of the disclosure. Furthermore, the drawings are intended to depict exemplary embodiments of the disclosure, and therefore is not considered as limiting in scope.

DETAILED DESCRIPTION

Various approaches in accordance with the present disclosure will now be described more fully hereinafter with reference to the accompanying drawings, where embodiments of the methods are shown. The approaches may be embodied in many different forms and are not to be construed as being limited to the embodiments set forth herein. Instead, these embodiments are provided so this disclosure will be thorough and complete, and will fully convey the scope of the system and method to those skilled in the art.

For the sake of convenience and clarity, terms such as "top," "bottom," "upper," "lower," "vertical," "horizontal," "lateral," and "longitudinal" will be used herein to describe the relative placement and orientation of these components and their constituent parts with respect to the geometry and orientation of a component of a device as appearing in the figures. The terminology will include the words specifically mentioned, derivatives thereof, and words of similar meaning and/or significance.

As used herein, an element or operation recited in the singular and proceeded with the word "a" or "an" is to be understood as including plural elements or operations, until such exclusion is explicitly recited. Furthermore, references to "one embodiment" of the present disclosure are not intended as limiting. Additional embodiments may also incorporate the recited features.

Figure 1:
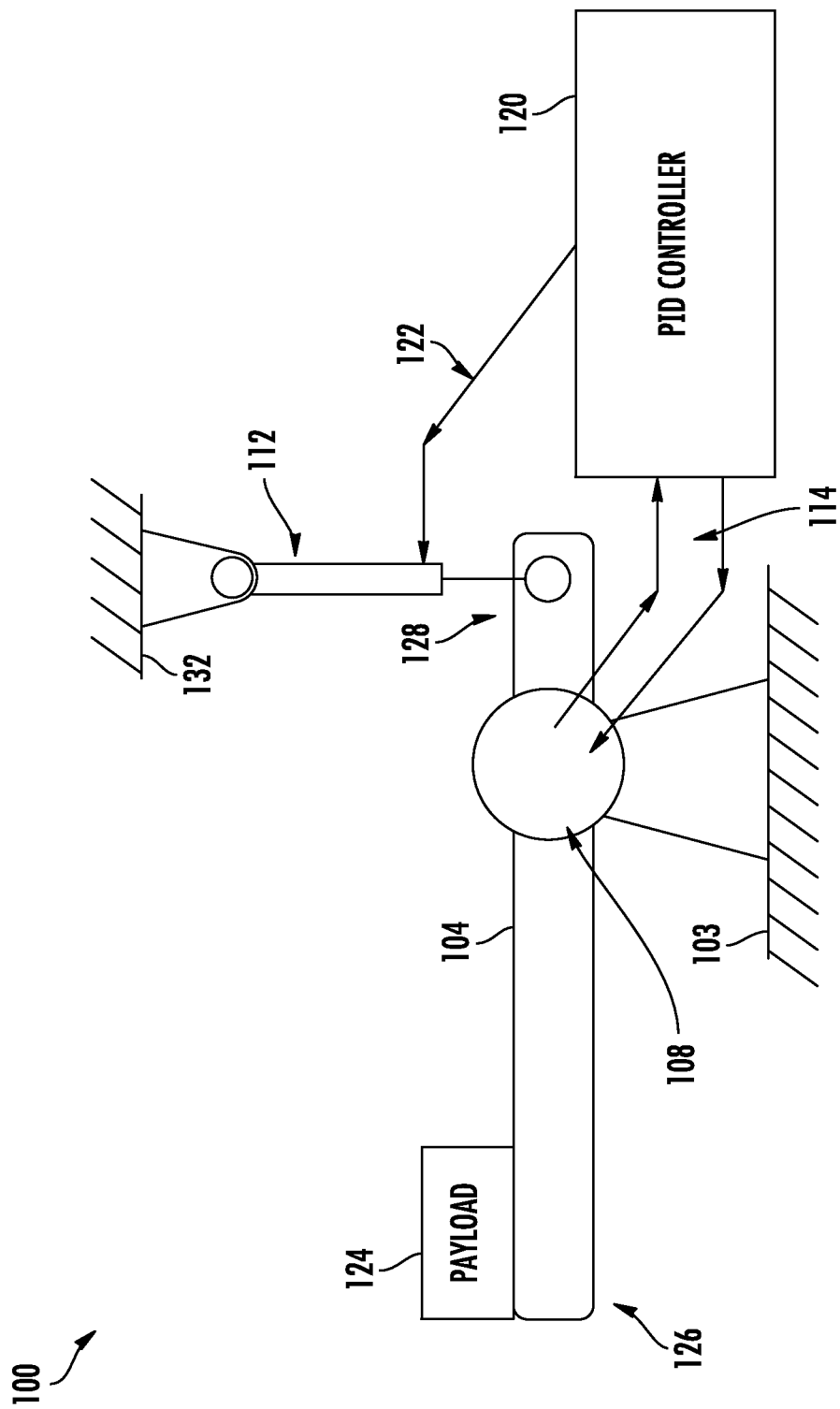
FIG. 1 shows a schematic of an exemplary apparatus in accordance with certain aspects of the present disclosure.

With reference now to the figures, FIG. 1 depicts a system 100 for providing proportional integral derivative control (PID) using multiple actuators. As shown, the system 100 includes a component under control, such as a handler or a robotic arm 104 coupled to a primary actuator 108 and a secondary actuator 112. In some embodiments, the primary actuator 108 and the secondary actuator 112 are motors having a feedback device such as an encoder.

The system 100 may operate using a first control loop 114 (e.g. a feedback closed-loop) including the primary actuator 108 in communication with a PID controller 120 for communicating one or more commands to the primary actuator 108, and using a second control loop 122 (e.g., a feed forward open loop) including the secondary actuator 112 in communication with the same PID controller 120 to provide one or more commands to the secondary actuator 112, as will be described in greater detail below. Unlike prior art approaches using one motor for controlling feedback and feedforward modes, embodiments herein employ the secondary actuator 112 dedicated for feed forward (open loop) control via the second control loop 122. The primary actuator 108 may then be used in feedback mode with the PID controller 120 for smaller error corrections.

In some embodiments, the robotic arm 104 includes an object 124 (e.g., a substrate) provided thereon, for example, at a distal end 126, and the robotic arm 104 is coupled to the secondary actuator 112 (e.g., a motor) at a proximal end 128. The primary actuator 108 is coupled to the robotic arm 104 between the distal end 126 and the proximal end 128. In a non-limiting embodiment, the primary actuator 108 and the secondary actuator 112 are fixed or mounted to surfaces 130 and 132, respectively.

During use, the robotic arm 104 may be moved, positioned, and otherwise controlled by the first control loop 114 and the second control loop 122. For example, applying forward and reverse power to the primary actuator 108 and/or the secondary actuator 112 lifts, lowers, and/or rotates the robotic arm 104. As will be described in greater detail below, the PID controller 120 calculates the motor power necessary for a specific move, such as a lift, lowering, and/or rotation the robotic arm, while also compensating for inertial, gravitational, and/or other internal or external forces of the system.

Figure 2:
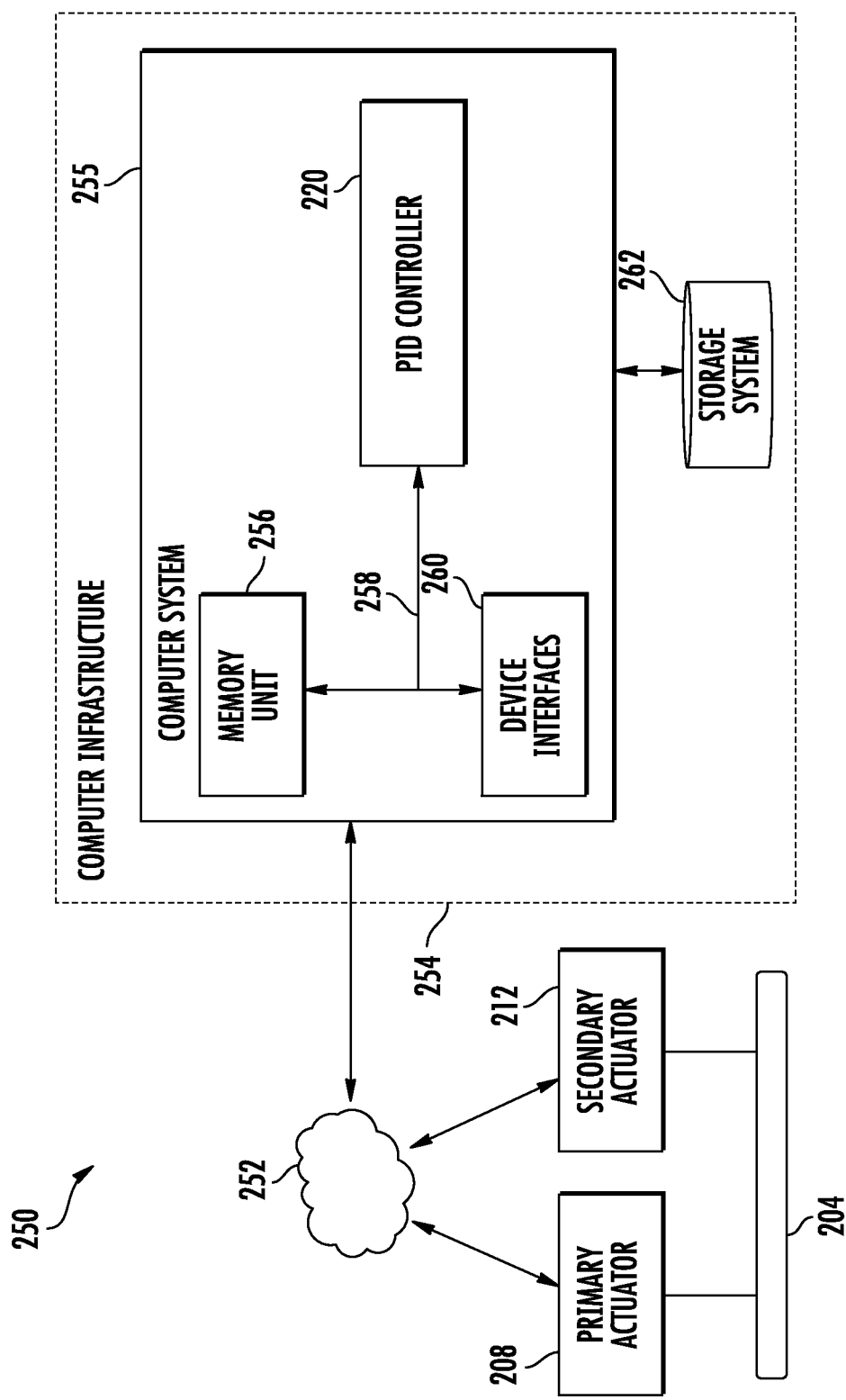
FIG. 2 shows a schematic of an exemplary computer system in accordance with certain aspects of the present disclosure.

Turning now to FIG. 2, a computer-implemented system 250 for providing PID control using multiple actuators will be described in greater detail. The system 250 is intended to demonstrate, among other things, embodiments herein can be implemented within a network environment 252 (e.g., the Internet, a wide area network (WAN), a local area network (LAN), a virtual private network (VPN), etc.), a cloud-computing environment, or on a stand-alone computer system. Still yet, the system 250 includes a computer infrastructure 254 including a computing device 255 intended to demonstrate some or all of the components of the system 250 could be deployed, managed, serviced, etc., by a service provider offering to implement, deploy, and/or perform the functions of the present embodiments for others.

The system 250 is intended to represent any type of computer system implemented in deploying/realizing the teachings recited herein. In this particular example, the system 250 represents an illustrative system for operating the PID controller 220 together with multiple actuators 208 and 212. The system 250 depicted is non-limiting, as any other computers implemented under various embodiments may have different components/software and will perform similar functions. As further shown, the system 250 includes a memory unit 256, a bus 258, and device interfaces 260.

The PID controller 220 refers, generally, to any apparatus for performing logic operations, computational tasks, control functions, etc. In some embodiments, the PID controller 220 may be a component of a processor. The PID controller 220 may include one or more subsystems, components, modules, and/or other processors, and may include various logic components operable using a clock signal to latch data, advance logic states, synchronize computations and logic operations, and/or provide other timing functions. During operation, the PID controller 220 may receive signals transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, the PID controller 220 executes computer program instructions or code stored in memory unit 256 and/or storage system 262. For example, when executing computer program instructions, the PID controller 220 causes the system 250 to receive position feedback and a specified trajectory for the robotic arm 204, generate a dynamic feedforward force command and a position correction command for the robotic arm 204 based on the position feedback and the specified trajectory, and provide, from the PID controller 220, the dynamic feedforward force command to the secondary actuator 212 coupled to the robotic arm 204, and the position correction command to a primary actuator 208 coupled to the robotic arm.

While executing computer program code, the PID controller 220 can read and/or write data to/from the memory unit 256 and/or the storage system 262. The storage system 262 may comprise VCRs, DVRs, RAID arrays, USB hard drives, optical disk recorders, flash storage devices, and/or any other data processing and storage elements for storing and/or processing data. Although not shown, system 250 could also include I/O interfaces communicating with one or more hardware components of computer infrastructure 254 to enable a user to interact with the system 250 (e.g., a keyboard, a display, camera, etc.). As will be described in further detail below, the computer infrastructure 254 is configured to operate with the primary actuator 208 and the secondary actuator 212.

Figure 3:
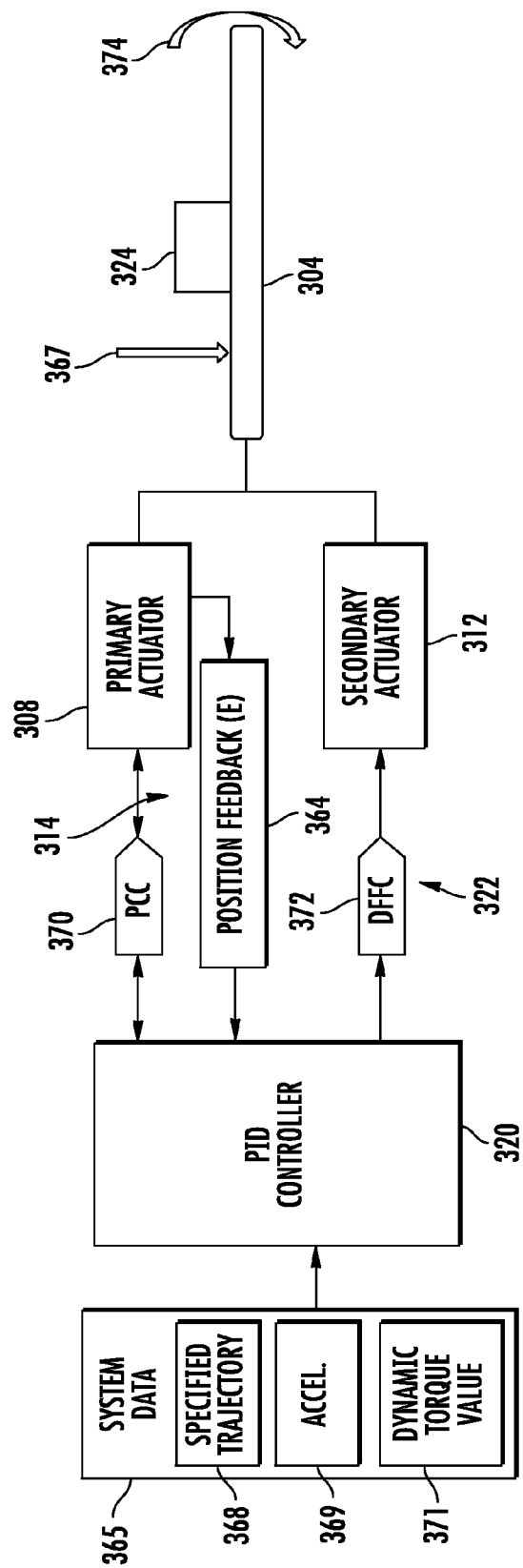
FIG. 3 shows a schematic of an exemplary system in accordance with certain aspects of the present disclosure.

Referring now to FIG. 3, operation of an exemplary PID controller will be described in greater detail. In this embodiment, the PID controller 320 is a control loop feedback device used to periodically calculate an error value as the difference between a measured process variable (PV) and an intended setpoint (SP). The PID controller 320 minimizes the error over time by adjusting a control variable, such as the position of the robotic arm 304, to a new value determined by a weighted sum shown in equation (1) below:

$$u(t) = K_p e(t) + K_i \int_0^t e(t)dt + K_d \frac{de(t)}{dt}, \quad (1)$$

wherein Kp, Ki, and Kd are all non-negative, and denote the coefficients for the proportional, integral, and derivative terms, respectively (sometimes denoted P, I, and D).

In this model, P accounts for present values of the error of the position of the robotic arm 304 (e.g. if the error is large and positive, the control variable will be large and negative), and I accounts for past values of the error (e.g. if the output is not adequate to reduce the size of the error, the control variable will accumulate over time, causing the controller to apply a stronger action). Furthermore, D accounts for possible future values of the error of the position of the robotic arm 304, based on its current rate of change.

In this embodiment, the first control loop 314 represents a PID closed-loop including the PID controller 320, the primary actuator 308, and a process to be controlled, such as movement of the robotic arm 304. A process variable PV associated with the process is measured and compared to a set point value SP, the target equilibrium value of the process variable PV. An error value e, defined as the difference of the set point and the measured process value, is supplied as the input to the PID controller 320 as position feedback 364, thus forming a feedback loop. The output of the PID controller 320 corresponds to one or more commands, such as a position correction command (PCC) 370, used to drive the process and apply a primary force 367, via the primary actuator 308, to the robotic arm 304 for minimizing positional error.

In some embodiments, physical or behavior characteristics of the robotic arm 304 may be codified in a transfer function. Generally, a transfer function describes the characteristic response of a system to standard stimuli. Autotuning methods may apply an autotuning algorithm, such as the Ziegler-Nichols technique, to a system's transfer function to generate or calculate appropriate gain values for the PID controller 320. These gains may then be applied to the PID controller 320 for operational control of the robotic arm 304. By varying parameter values of the autotuning algorithm in response to user input, gain values may be determined, resulting in a control system of an intended stiffness, movement, or with a particular response time.

More specifically, in one embodiment, PID tuning is an iterative process resulting in the optimal coefficients for the proportional, integral, and derivative terms, such as those shown in in equation (1) above. In general, PID tuning will be done in multiple attempts to satisfy one or more performance requirements, such as (yet not limited to) peak overshoot or settling time. Once tuning is completed, the proportional, integral, and derivative terms are set and will dictate the system bandwidth, or natural frequency of the system. Since the natural frequency causes unintended electro-mechanical resonance of the system, in general, the higher the system bandwidth, the more stable the system.

In one embodiment, the first control loop 314 is tuned by performing an iterative process to determine optimal values for the proportional, integral term, and derivative terms of equation (1) above, equation (1) determining a position of the robotic arm. Equation (1) calculates the error value as the difference between the position feedback and an intended setpoint position of the robotic arm. The calculated error value may then be used to determine the PCC 370.

There are several methods for tuning the first control loop 314. One non-limiting approach involves the development of some form of a process model, and then choosing P, I, and D based on the dynamic model parameters. For example, in the case the system can be taken offline, one tuning approach involves subjecting the system to a step change in input, measuring the output as a function of time, and using this response to determine the control parameters. In another approach, mathematical PID loop tuning may induce an impulse in the system, and then use the controlled system's frequency response to design the PID loop values. Some digital loop controllers may provide a self-tuning feature for providing small setpoint changes to the process, thus allowing the controller itself to calculate optimal tuning values. Performance of the PID controller 320 may be improved by combining the feedback control of the first control loop 314 with the feed-forward control of the second control loop 322. Specifically, system data 365, such as a specified trajectory 368, an acceleration 369, and a dynamic torque value 371 of the robotic arm 304 can be fed forward to the secondary actuator 312, as a dynamic feedforward force command (DFFC) 372. In one embodiment, torque feed forward is a method using specific model based information for pre-calculation of the dynamic torque value for a given trajectory. For example, feed forward forces or torques may be calculated using Newton's Second Law. For linear applications, the equation Force=Mass*Acceleration can be used. For rotary applications, the equation Torque=Mass Moment*Angular Acceleration can be used. In some embodiments, "specific model based information" refers to the system Mass (linear) or Mass Moment (rotary). Furthermore, the terms, "trajectory", "motion profile", or "planned path" refer to the acceleration (linear) or angular acceleration (rotary). The DFFC 372, along with the position correction command 370 of the first control loop 314, improve the overall system performance.

In exemplary embodiments, the secondary actuator 312 is dedicated to feed forward (open loop) control, and the primary actuator 308 is operated in feedback mode for smaller corrections on the error. In other words, inclusion of the secondary actuator 312 allows the PID controller 320 to primarily compensate the difference or error remaining between the setpoint (SP) and the system response to the open loop control (e.g., DFFC 372) of the second control loop 322. When the feed-forward output is provided to the secondary actuator 312, independent of the position feedback 364 and the primary actuator 308, the system response is improved with the added benefit of increasing stability (e.g., no unbounded oscillation). Feed forward can be based on the setpoint and on extra measured disturbances. Setpoint weighting is one form of feed forward.

In one non-limiting example, in order to accelerate a mechanical load from the object 324 under control, a feed forward torque is provided. In this case, the PID controller 320 is being used to control the speed of the load and command the torque 374 being applied by the secondary actuator 312. Using the intended trajectory may be beneficial, and system dynamics equations for calculating feedforward torque add the trajectory to the output (e.g., the DFFC 372) of the second control loop 322. In this case, although the object 324 and the robotic arm 304 is being accelerated or decelerated from the primary actuator 308 and primary force 367, an amount of torque 374 is independently commanded from the secondary actuator 312 via the feedback DFFC 372. The second control loop 322 in this situation uses the position feedback 364 to change the combined output, DFFC 372, while the first loop 314 uses the position feedback 364 to reduce the remaining difference between the process setpoint and the process variable based on the position feedback 364. Working together, the open-loop feed-forward control provided by the secondary actuator 312 and the PID controller 320, combined with the closed-loop feedback control provided by the primary actuator 308 and the PID controller 320, provide a more responsive control system overall.

Figure 4:
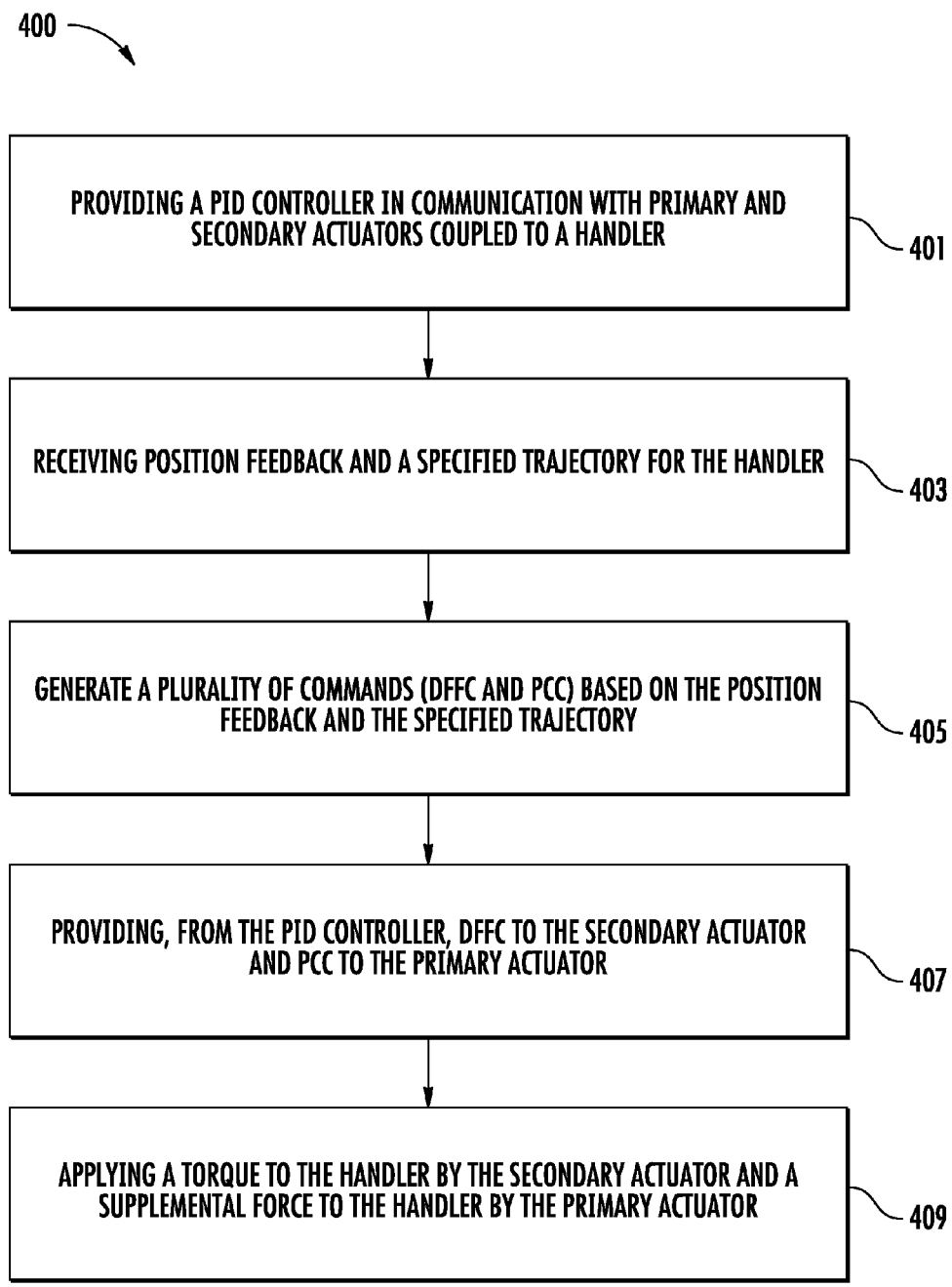
FIG. 4 is a flowchart illustrating an exemplary process according to the present disclosure.

FIG. 4 depicts a flow diagram of a process 400 for providing a PID controller operable with multiple actuators, in accordance with certain aspects of the present disclosure. In some embodiments, the process 400 may be implemented using a computer system (e.g., the system 250 of FIG. 2). As such, the process 400 of FIG. 4 may illustrate the functionality and/or operation of possible implementations of systems, methods, and computer program products according to various embodiments of the present disclosure. In this regard, the blocks in the flowchart may represent a module, segment, or portion of code, comprising one or more executable instructions for implementing the specified logical function(s). As also noted, in some alternative implementations, the functions noted in the blocks might occur out of the order depicted in the figures. For example, two blocks shown in succession may, in fact, be executed concurrently. As also noted, the blocks of the process 400 can be implemented by special purpose hardware-based systems for performing the specified functions or acts, or combinations of special purpose hardware and computer instructions.

In one embodiment, the process 400 may include providing a PID controller in communication with a primary actuator and a secondary actuator, as shown at block 401, wherein the primary and secondary actuators are coupled to a handler. In some embodiments, the primary actuator and the PID controller form a first control loop, and the secondary actuator and the PID controller form a second control loop. In some embodiments, the handler is a robotic arm. In some embodiments, an object is coupled to the handler. In some embodiments, the primary actuator and the secondary actuator are motors.

The process 400 may further include receiving position feedback and a specified trajectory for the handler, as shown at block 403. In some embodiments, the position feedback and the specified trajectory are received at the PID controller. In some embodiments, the process includes calculating a dynamic torque for the specified trajectory of the handler. The process 400 may further include generating a plurality of commands based on the position feedback and the specified trajectory, as shown at block 405. In some embodiments, a dynamic feedforward force command (DFFC) and a position correction command (PCC) are generated by the PID controller. In some embodiments, the first control loop is tuned by performing an iterative process to determine optimal values for a proportional term, an integral term, and a derivative term of an equation determining a position of the robotic arm. The equation may calculate an error value as the difference between the position feedback and an intended setpoint position of the robotic arm, wherein the error value is used to determine the position correction command.

The process 400 may further include providing, from the PID controller, the DFFC to the secondary actuator and the PCC to the primary actuator, as shown in block 407.

The process 400 may further include applying a torque by the secondary actuator to the hander, in response to the DFFC, and applying a supplemental force by the primary actuator to correct a positional error of the handler, in response to the PCC, as shown in block 409.

In sum, embodiments of the disclosure are applicable with a robot/mechanism arm, where motion quality is influential to the overall function. A primary (e.g., master) actuator is capable of pivoting the robot arm, and a PID Control System uses an encoder to provide feedback for the position of the arm and ultimate calculation of error. The position of the arm and the planned trajectory are used to calculate the dynamic torque for the movement. The dynamic torque (e.g., feed forward) is applied to the arm using a secondary (e.g., slave) actuator, thus enabling the remaining error to be corrected by applying a supplemental force via the primary master actuator. The secondary actuator is designated for applying the dynamic torque or force.

A first advantage of the disclosure includes the reduction of the peak torque of the primary actuator, thus allowing a smaller primary actuator to be used. This has the benefit of reducing packaging and associated costs. A second advantage of the disclosure includes providing a majority of the toque (or force) from the secondary motor. This allows the primary motor to be more closely monitored for identification of wear. A third advantage of the disclosure relates to serviceability. Unlike the primary actuator requiring disassembly of the robot/mechanism, the secondary actuator can be serviced or replaced while the primary actuator and the robot/mechanism remain in place. This decreases downtime and increases throughput. A fourth advantage of the disclosure relates to system stability. The addition of a secondary actuator, for the purpose of torque feed forward implementation will increase system bandwidth, as compared to a system using one actuator for feedback and feed forward control.

While certain embodiments of the disclosure have been described herein, the disclosure is not limited thereto, as the disclosure is as broad in scope as the art will allow and the specification may be read likewise. Therefore, the above description is not to be construed as limiting. Instead, the above description is merely as exemplifications of particular embodiments. Those skilled in the art will envision other modifications within the scope and spirit of the claims appended hereto.

The invention claimed is:

1. A method comprising:
providing a proportional integral derivative (PID) controller in communication with a primary actuator and a secondary actuator, the primary actuator and the secondary actuator coupled to a handler, wherein the primary actuator is coupled to the handler from a position below the handler, and wherein the secondary actuator is coupled to the handler from a position above the handler;
receiving position feedback and a specified trajectory for the handler;
generating a dynamic feedforward force command and a position correction command for the handler based on the position feedback and the specified trajectory; and
providing, from the PID controller, the dynamic feedforward force command to the secondary actuator and the position correction command to the primary actuator.

2. The method of claim 1, further comprising applying a torque by the secondary actuator to the handler in response to the dynamic feedforward force command.

3. The method of claim 1, further comprising applying a supplemental force by the primary actuator to correct a positional error of the handler in response to the position correction command.

4. The method of claim 1, wherein the primary actuator and the secondary actuators are motors.

5. The method of claim 1, further comprising coupling an object to the handler.

6. The method of claim 1, further comprising calculating a dynamic torque for the specified trajectory of the handler.

7. The method of claim 1, wherein the handler is a robotic arm.

8. A system comprising:
- a robotic arm coupled to a primary actuator and a secondary actuator, wherein the primary actuator is coupled to the robotic arm from a position below the robotic arm, and wherein the secondary actuator is coupled to the robotic arm from a position above the robotic arm;
- a first control loop including the primary actuator in communication with a proportional integral derivative (PID) controller, wherein the first control loop communicates, from the PID controller, a position correction command to the primary actuator based on position feedback from the robotic arm; and
- a second control loop including the secondary actuator in communication with the PID controller, wherein the second control loop communicates a dynamic feedforward force command to the secondary actuator based on the position feedback and a specified trajectory of the robotic arm.

9. The system of claim 8, wherein the secondary actuator applies a torque to the robotic arm in response to the dynamic feedforward force command.

10. The system of claim 8, wherein the primary actuator applies a supplemental force to the robotic arm to correct a positional error.

11. The system of claim 8, wherein the primary actuator and the secondary actuator are motors coupled to the robotic arm at different positions.

12. The system of claim 8, wherein the primary actuator is coupled to the robotic arm at a first position, and wherein the secondary actuator is coupled to the robotic arm at a second position located at a proximal end of the robotic arm.

13. The system of claim 8, further comprising tuning the first control loop by performing an iterative process to determine optimal values for a proportional term, an integral term, and a derivative term of an equation determining a position of the robotic arm, wherein the equation calculates an error value as a difference between the position feedback and an intended setpoint position of the robotic arm, and wherein the error value is used to determine the position correction command.

14. A computer system for providing proportional integral derivative (PID) control using multiple actuators, the computer system comprising:
- a memory medium comprising program instructions; and
- a PID controller, wherein the PID controller, when executing the program instructions, causes the computer system to:
  - receive position feedback and a specified trajectory for a robotic arm;
  - generate a dynamic feedforward force command and a position correction command for the robotic arm based on the position feedback and the specified trajectory;
  - provide, from the PID controller, the dynamic feedforward force command to a secondary actuator coupled to the robotic arm; and
  - provide, from the PID controller, the position correction command to a primary actuator coupled to the robotic arm, wherein the primary actuator is coupled to the robotic arm from a position below the robotic arm, and wherein the secondary actuator is coupled to the robotic arm from a position above the robotic arm.

15. The computer system of claim 14, the PID controller further causing the computer system to apply a torque by the secondary actuator to the robotic arm in response to the dynamic feedforward force command.

16. The computer system of claim 14, the PID controller further causing the computer system to apply a supplemental force by the primary actuator to correct a positional error of the robotic arm.

17. The computer system of claim 14, wherein the primary actuator and the secondary actuators are motors coupled to the robotic arm.

18. The computer system of claim 14, further comprising an object coupled to the robotic arm.

19. The computer system of claim 18, wherein the object is coupled to the robotic arm at a distal end of the robotic arm, and wherein the secondary actuator is coupled to the robotic arm at a proximal end of the robotic arm.

20. The computer system of claim 14, the PID controller further causing the system to calculate a dynamic torque for the specified trajectory of the robotic arm.

* * * * *